United States Patent
Dash et al.

(10) Patent No.: US 10,575,198 B1
(45) Date of Patent: Feb. 25, 2020

(54) MOBILE WIRELESS CHARGING STATION

(71) Applicant: Quantenna Communications, Inc., Fremont, CA (US)

(72) Inventors: Debashis Dash, Newark, CA (US); Bahador Amiri, Saratoga, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 204 days.

(21) Appl. No.: 15/635,170

(22) Filed: Jun. 27, 2017

(51) Int. Cl.
*H04W 24/08* (2009.01)
*H02J 7/02* (2016.01)
*B60P 3/00* (2006.01)
*B64C 39/02* (2006.01)
*H04W 84/12* (2009.01)
*H04B 17/318* (2015.01)

(52) U.S. Cl.
CPC ........... *H04W 24/08* (2013.01); *B60P 3/00* (2013.01); *B64C 39/024* (2013.01); *H02J 7/025* (2013.01); *B64C 2201/12* (2013.01); *H04B 17/318* (2015.01); *H04W 84/12* (2013.01)

(58) Field of Classification Search
None
See application file for complete search history.

(56) References Cited

U.S. PATENT DOCUMENTS

| | | | |
|---|---|---|---|
| 9,594,372 B1* | 3/2017 | Sills | G05D 1/0011 |
| 9,867,017 B1* | 1/2018 | Bacarella | H04W 4/029 |
| 2007/0061041 A1* | 3/2007 | Zweig | G05D 1/0261 700/245 |
| 2011/0218014 A1* | 9/2011 | Abu-Qahouq | H02J 17/00 455/522 |
| 2013/0147429 A1* | 6/2013 | Kirby | H02J 7/025 320/108 |
| 2013/0288600 A1* | 10/2013 | Kuusilinna | H02J 7/0004 455/41.2 |
| 2017/0047782 A1* | 2/2017 | Shevde | H02J 7/025 |
| 2017/0140349 A1* | 5/2017 | Ricci | G06Q 20/102 |

\* cited by examiner

*Primary Examiner* — Sai Aung
*Assistant Examiner* — Richard Schnell
(74) *Attorney, Agent, or Firm* — Maschoff Brennan

(57) ABSTRACT

Methods and systems for mobile charging of wireless stations with wireless communications on a wireless local area network (WLAN). A mobile charging unit is operable with coordinated wireless asset management for navigation and mobile charging capabilities to service wireless stations. In an example implementation, a mobile charging unit identifies stations on the WLAN are battery operated and support wireless charging, determines when a charging operation is needed, provides automated navigation to the associated stations, and initiates wireless charging of the identified stations.

25 Claims, 3 Drawing Sheets

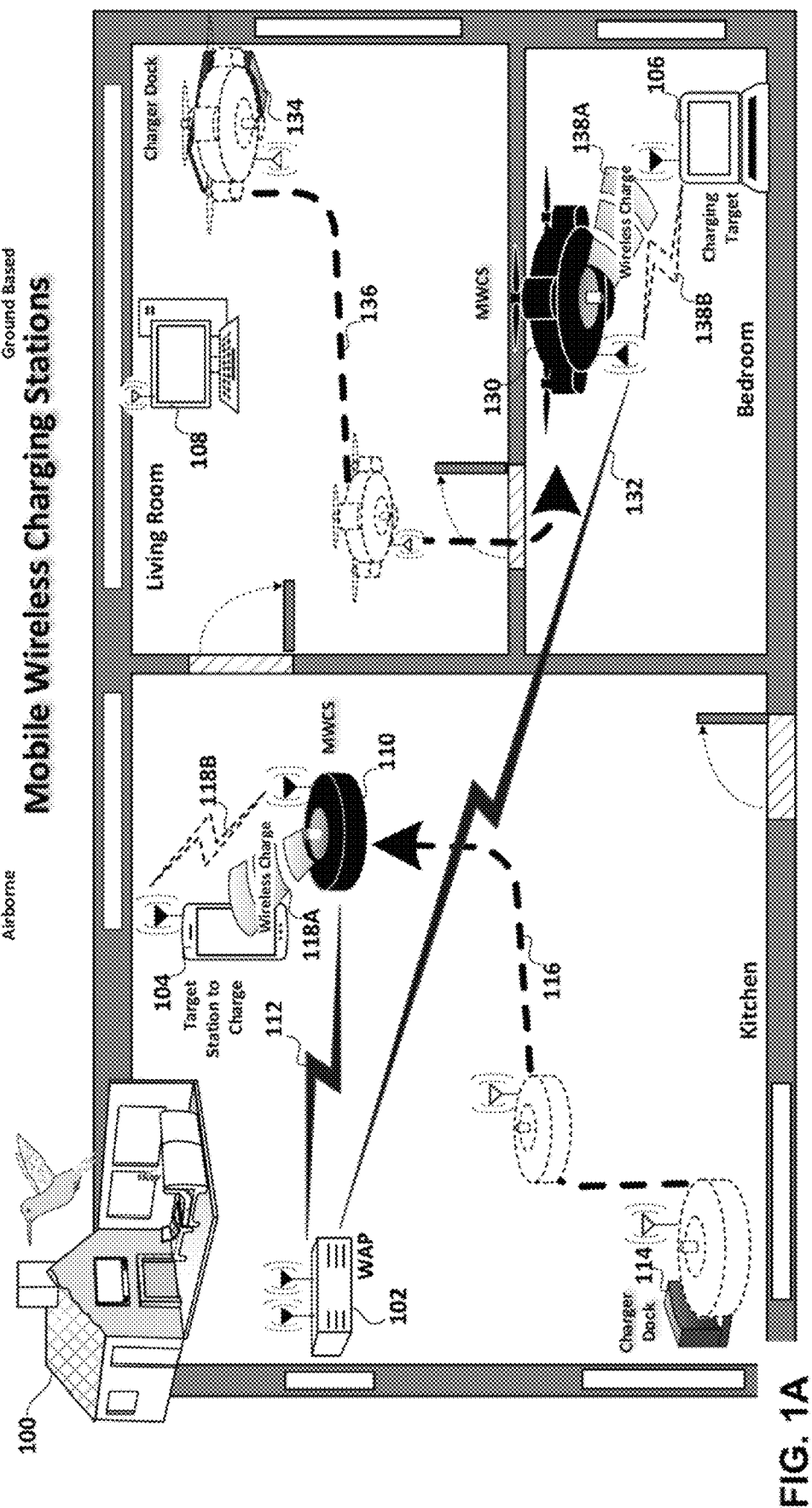
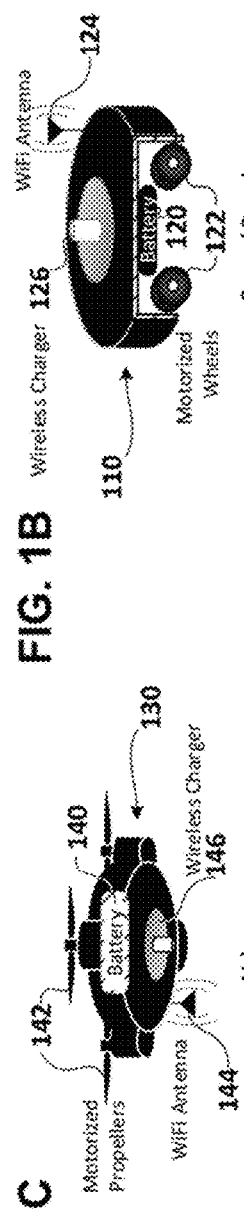
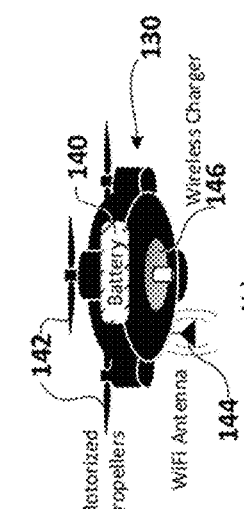

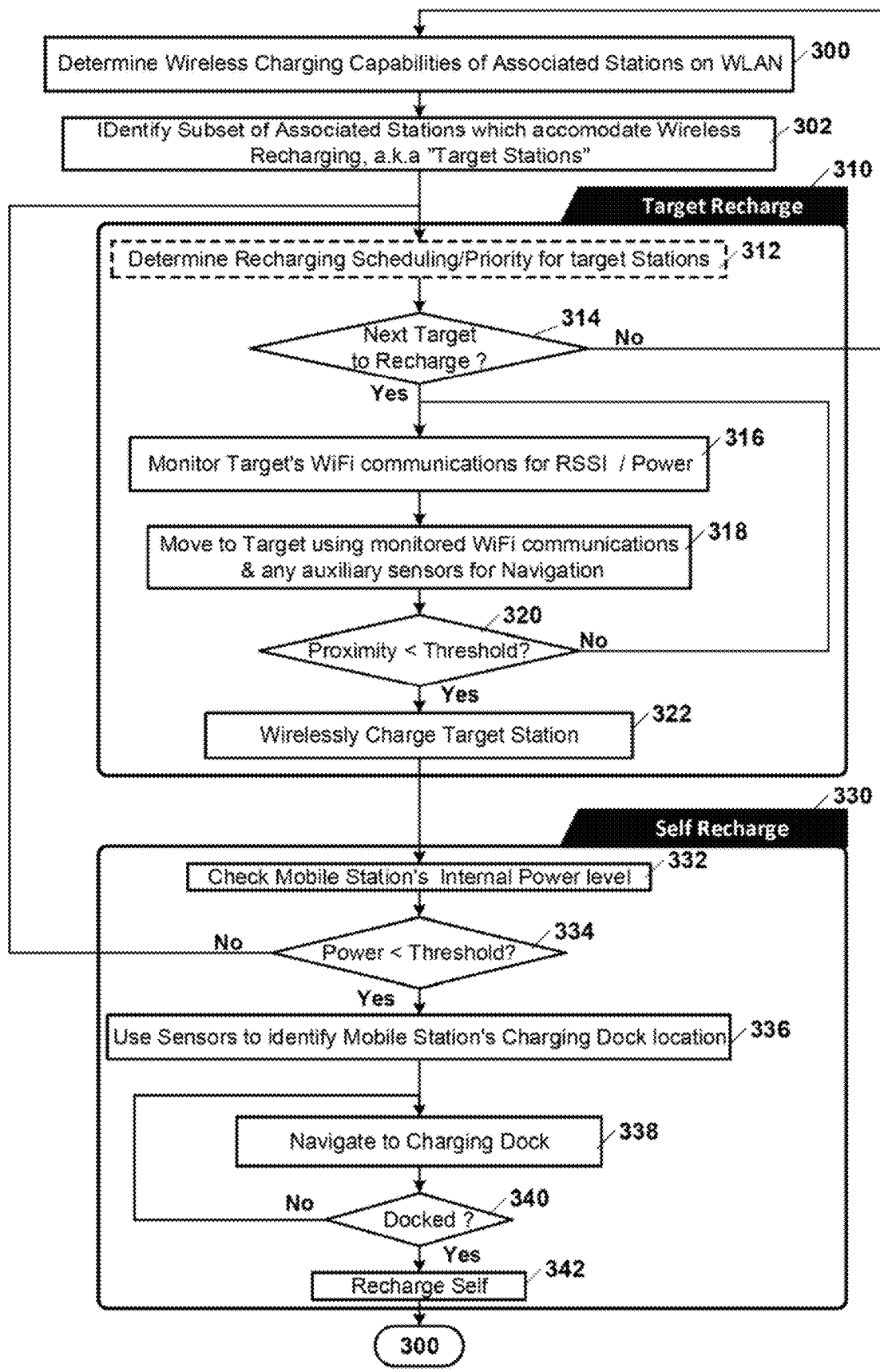
FIG. 3  Method for Operating a Mobile Wireless Charging Station

MOBILE WIRELESS CHARGING STATION

BACKGROUND OF THE INVENTION

1. Field of Invention

The field of the present invention relates in general to wireless local area networks including wireless access points (WAP) and wireless stations.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras, smoke detectors, door locks, temperature controls, etc. to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols: being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collison Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Starting with the IEEE 802.11ax standard two or more of the associated stations can uplink concurrently to the WAP using either the same set of orthogonal frequency division multiplexed (OFDM) tones, a.k.a. MU-MIMO uplink, or distinct sets of OFDM tones, a.k.a. an orthogonal frequency division multiplexed access (OFDMA) uplink.

What is needed are improved methods for operating each WAP and its associated stations.

SUMMARY OF THE INVENTION

The present invention provides a method and apparatus for a mobile one among the stations on a wireless local area network (WLAN) to recharge other stations on the WLAN.

In an embodiment of the invention a wireless station for wireless communications on a selected communication channel of a wireless local area network (WLAN) having a wireless access point (WAP) and a plurality of stations associated with the WAP is disclosed. The wireless station includes: at least one antenna, a plurality of components, a wireless asset management circuit, a navigation circuit, and a wireless charger circuit. The plurality of components are coupled to one another to form transmit and receive chains coupled to the at least one antenna for wireless communications on the selected communication channel. The wireless asset management circuit is coupled to the plurality of components to identify any of the plurality of stations which support wireless charging. The navigation circuit is coupled to the plurality of components to control movement of the wireless station into a position proximate to an identified one of the plurality of stations which supports wireless charging. The wireless charger circuit is coupled to the wireless asset management circuit to initiate wireless charging of the identified one of the plurality of stations from the position proximate thereto.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C are respectively; a plan view of a residential wireless local area network (WLAN) including the mobile wireless charging stations (MWCS), and cross-sectional views of the ground based and airborne MWCS respectively.

FIG. 3 is a process flow diagram of processes associated with operating the MWCS.

DETAILED DESCRIPTION OF THE EMBODIMENTS

Figure 2:
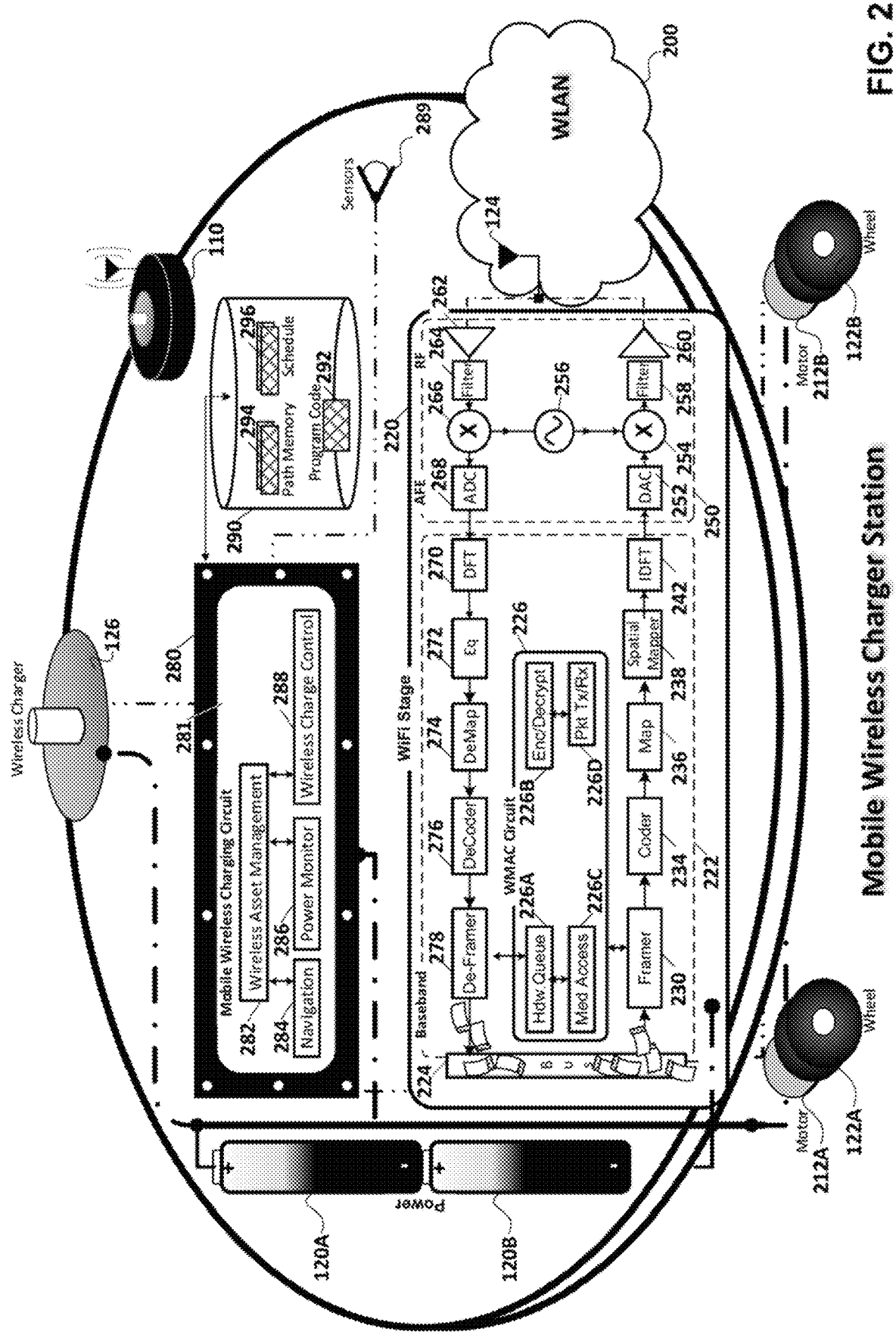
FIG. 2 is a detailed hardware block diagram of the MWCS.

FIGS. 1A-C are respectively plan view of a residential wireless local area network (WLAN) including the mobile wireless charging stations (MWCS), and cross-sectional views of the ground based and airborne MWCS respectively. The residential WLAN shown in FIG. 1A in home 100 includes: a WAP 102 and associated stations, e.g., mobile phone 104, notebook computer 106, desktop computer 108, ground based MWCS 110, and airborne MWCS 130. All stations 104, 106, 108, 110, 130 maintain a communication link with the WAP. Mobile ground based wireless charging station 110 has a charging dock 114 plugged into a wall outlet (not shown) for recharging MWCS 110 integral power source. MWCS 110 automatically returns to its charging dock on an as needed basis. In an embodiment of the invention the return of MWCS 110 to its charging dock is accomplished by its homing in on an infrared beacon (not shown) emitted by charging dock 114. Mobile airborne wireless charging station 130 has a charging dock 134 plugged into a wall outlet (not shown) for recharging MWCS 130 integral energy source. MWCS 130 automatically returns to. its charging dock on an as needed basis. In an embodiment of the invention the return of MWCS 130 to its charging dock is also accomplished by its homing in on an infrared beacon (not shown) emitted by charging dock 134. In an embodiment of the invention the MWCS operates as a household robot, not only to perform the wireless charging described herein, but also additional household tasks without departing from the scope of the claimed invention.

In operation either mobile charging station is capable of identifying which of the associated stations on the WLAN is battery operated and supports wireless recharging/charging of the battery. This identification is in an embodiment of the invention determined during a capabilities exchange between the WAP and each station, such as that which is part of the IEEE 802.11 standard. In an embodiment of the invention the MWCS sniffs this communication to determine which stations can be targets for wireless recharging. In another embodiment of the invention the WAP passes this capability information to the MWCS. The ground based MWCS 110 is shown with a communication link 112 to the WAP. Airborne MWCS 130 is shown with a communication link 132 directly to the WAP. The communication link between either the ground based or airborne MWCS and the WAP may be direct or multi-hop via for example: a repeater, range extender or MESH node; without departing from the scope of the claimed invention. In another embodiment of the invention the MWCS identifies stations which can be targets for wireless recharging through direct communications with the station. Stations 104 and 106 are identified as supporting wireless charging, and station 108 is determined not to support wireless charging. Each MWCS retains this capability information on an internal target table.

In an embodiment of the invention the ground based and airborne MWCS move toward a target station by monitoring the communications of the target station with the WAP to determine the received signal strength indicator (RSSI) and power of the signal, and moving closer to the target as indicated by an increase in the RSSI or signal power of the target stations communications. As shown in FIG. 1A the ground based MWCS 110, initially located at charging dock 114, has identified station 104 as a charging target. In response to the identification, the MWCS 110 moves toward the target station 104 along a path 116 which avoids obstacles and increases the RSSI of the communications from the target station as monitored by the ground based MWCS. Similarly, the airborne MWCS 130, initially located at charging dock 134, has identified station 106 as a charging target. In response to the identification, the MWCS 130 moves toward the target station 106 along a path 136 which avoids obstacles and increases the RSSI of the communications from the target station as monitored by the airborne MWCS. In another embodiment of the invention auxiliary sensors, e.g. Light Detection and Ranging (Lidar) sensor, image sensor, mechanical bumper sensor, infrared (IR) sensor, GPS sensor, etc. may be used to complement the WiFi based navigation of either MWCS toward its intended recharging target or a return to its charging dock. In another embodiment of the invention the target station and MWCS may utilize their WiFi capabilities to directly communicate with one to assist in the navigation. In another embodiment of the invention the path metrics for path 116 may be entered by the homeowner into the MWCS via an online application. When ground based MWCS 110 has reached a position proximate the target station 104 it initiates wireless charging. When airborne MWCS 130 has reached a position proximate target station 106 it initiates wireless charging.

Wireless charging involves the wireless transfer of energy from an power source on the MWCS, e.g. a battery or capacitor, to a power source, e.g. a battery or capacitor, on the target station. In an embodiment of the invention the transfer of energy is accomplished via low frequency electromagnetic induction via a complementary pair of coils on the MWCS and the target station. In another embodiment of the invention the transfer of energy is accomplished via high frequency electromagnetic induction via a complementary pair of antenna(s) on the MWCS and the target station. In still another embodiment of the invention the transfer of energy is accomplished via high frequency electromagnetic induction by repurposing the existing WiFi antennas on the MWCS and the target station. The link 118A between ground based MWCS 110 and target station 104 represents the electromagnetic coupling between a dedicated recharging component, e.g. antenna or coil, on the MWCS with similar components on the target station over which link the energy transfer from MWCS to the target station is accomplished. In another embodiment of the invention the link 118B between ground based MWCS 110 and target station 104 repurposes the MWCS's existing WiFi antenna to accomplish the electromagnetic coupling between MWCS and target station over which recharging of the target station takes place. Similarly, for the embodiment of the invention in which the MWCS is airborne the link 138A between airborne MWCS 130 and target station 106 represents the electromagnetic coupling between a dedicated recharging component, e.g. antenna or coil, on the MWCS with similar components on the target station over which link the energy transfer from MWCS to the target station is accomplished. In another embodiment of the invention the link 138B between ground based MWCS 130 and target station 106 repurposes the MWCS's existing WiFi antenna to accomplish the electromagnetic coupling between MWCS and target station over which recharging of the target station takes place.

In an embodiment of the invention an MWCS intelligently schedules when to recharge each of the identified stations. Recharging of the identified stations may be executed in a round-robin fashion. Alternately, recharging of the identified stations may be executed on an as needed basis. The need to recharge a station may be determined inferentially based on a degradation of RSSI or power of the identified station. In another embodiment of the invention the need to recharge a station may be determined inferentially by the MWCS based either or both the time the target station has been in operation and or the amount of traffic sent by that station. Alternately the need to recharge a station may be determined directly via a WiFi communication with the target station by either the WAP or by the MWCS directly, in which parameters such as: battery capacity, battery charge level are obtained. In the former case the WAP would relay the information to the MWCS. In the latter case the target station would send the information directly to the MWCS over either the WiFi or other communication link, e.g. Bluetooth, Zigby, Thread . . . etc. In an embodiment of the invention a history of a target station's prior charge amount, and the intervals at which charging is required may be incorporated into the recharging schedule determination. In an embodiment of the invention the MWCS notifies the target station either that is scheduled for a charge, or that it is on its way to deliver the charge.

When the MWCS detects that the energy level of its internal power component e.g. battery, capacitor, etc., falls below a threshold level it returns to its charger dock. In an embodiment of the invention the return navigation is made by the MWCS tracking an infrared (IR) homing beacon emitted by the charger dock. In an embodiment of the invention where the charger dock itself has WiFi capability, the return is made by the MWCS tracking the RSSI or power of the charger dock to move to the docking position at which the RSSI is maximized. The charger dock may have wired or wireless interface for recharging the MWCS. Once the MWCS is recharged it is ready to resume its role of recharging target stations on the WLAN which support wireless recharging.

In FIG. 1B a cross-sectional view of the ground based MWCS 110 is shown. The ground based MWCS include a battery 120, motorized wheels 122, a dedicated wireless charger component 126, e.g. antenna or coil, and one or more WiFi antenna 124.

In FIG. 1C a cross-sectional view of the airborne MWCS 130 is shown. The airborne MWCS includes a battery 140, motorized propellers 142, a dedicated wireless charger component 146, e.g. antenna or coil, and one or more WiFi antenna 144.

FIG. 2 is a detailed hardware block diagram of a representative one of the MWCS, specifically ground based MWCS 110 in accordance with an embodiment of the invention. The ground based MWCS includes: a WiFi stage 220 which couples the MWCS to the WLAN; an integral power component 120A-B which energizes all components and circuits of the MWCS; a mobility component, e.g. motor and wheel sets 212A & 122A, 212B & 122B which move the MWCS throughout the home or business; a wireless charger 126 for recharging targeted ones of the stations on the WLAN of which the MWCS is a part; optional sensors 289 for proximity and obstacle detection; a very large scale integrated (VLSI) processor 280 for instantiating a Mobile wireless charging circuit for controlling the operation of the MWCS; and non-volatile memory or storage 290 for storing the program code executed by the processor. The airborne MWCS 130 includes similar components to those introduced above, with the exception of the mobility component which in the case of the airborne MWCS comprises motorized propellers 142.

The mobile wireless charging circuit 281 in an embodiment of the invention is instantiated by the VLSI processor 280 executing of program code 292 stored on memory 290. The mobile wireless charging circuit includes: a wireless asset management circuit 282 for identifying which stations on the WLAN support wireless charging and when to charge them; a navigation circuit 284 to control movement of the MWCS to each target station for charging, and to the charging dock for self recharging; a power monitor circuit 286 for determining when the MWCS needs to recharge itself at its own charger dock, and a wireless charge control circuit 288 for controlling the wireless charger 118 during recharging of each target station.

WiFi: The WiFi stage 220 includes a plurality of shared and discrete components which make up the transmit and receive chains coupled to antenna 124. In an embodiment of the invention the WiFi stage may include a MIMO array of antenna each with corresponding transmit and receive paths. The WiFi stage includes a baseband circuit 222 and analog front end (AFE) and radio frequency (RF) circuit 250 and antenna 124. The WiFi stage provides wireless communications for the MWCS on the WLAN 200 in home 100.

WiFi TRANSMISSION: The transmit chain baseband portion 222 includes the following discrete and shared components. Data to be transmitted on the packet based bus 224 is initially processed by the WiFi medium access control (WMAC) component 226. The WMAC includes: hardware queues 226A for each downlink and uplink communication stream; encryption and decryption circuits 226B for encrypting and decrypting the downlink and uplink communication streams; medium access circuit 226C for making the clear channel assessment (CCA), and making exponential random backoff and re-transmission decisions; and a packet processor circuit 226D for packet processing of the communication streams. Each sounding or data packet for wireless transmission on the transmit path components to the WAP is framed in the framer 230. Next the transmit stream is encoded and scrambled in the encoder and scrambler 234 followed by interleaving and mapping in the interleaver mapper 236. Next the transmission is spatially mapped in the spatial mapper 238. The spatially mapped stream(s) from the spatial mapper are input to Inverse Discrete Fourier Transform (IDFT) component 242 for conversion from the frequency to the time domain and subsequent transmission in the AFE and RF stage 250.

The IDFT is coupled to a corresponding one of the transmit chain components in the AFE/RF stage 250. Specifically, the IDFT couples to the digital-to-analog converters (DAC) 252 for converting the digital transmission to analog, upconverters 254, coupled to a common channel frequency voltage controlled oscillator (VCO) 256 for upconverting the transmission to the appropriate center frequency of the selected channel(s), filter 258, e.g. bandpass filter, for controlling the bandwidth of the transmission, and power 110 amplifier 260 coupled to antenna(s) 124.

WiFi RECEPTION: The receive chain includes the following discrete and shared components. Received communications on the MWCS's WiFi antenna 124 are subject to RF processing including downconversion in the AFE-RF stage 250. The receive chain includes the following discrete and shared components: low noise amplifier (LNA) 262 for amplifying the received signal under control of an analog gain control (AGC) (not shown) for setting the amount by which the received signal is amplified; filter 264 for bandpass filtering the received signals; downconverter 266 coupled to the VCO 256 for downconverting the received signals; analog-to-digital convertor (ADC) 268 for digitizing the downconverted signals. The digital output from each ADC is passed to the baseband stage 222 and specifically The discrete Fourier transform (DFT) component 270 for conversion from the time to the frequency domain. The equalizer 272 accepts input from the DFT and mitigates channel impairments thereon converting the received communication on the chain into a distinct communication stream at the output. Next the demapper deinterleaver 274 converts the received symbol to bits which are deinterleaved. The decoder 276 decodes the received communication, and the de-framer 278 deframes it. The received communication is then passed to the WMAC component 226 where it is decrypted with the decryption circuit 226B and placed in the appropriate downlink hardware queue 226A for transfer to the packet based bus 224.

The WiFi stage 220 is coupled to the mobile wireless charging circuit 281 to enable the wireless asset management circuit 282 to determine the capabilities of the associated stations: either by sniffing the capabilities exchange between each station with the WAP or by direct communication with the WAP or stations themselves. The wireless asset management circuit also utilizes its connection to the WiFi stage to determine when to charge the identified stations which support wireless recharging. In an embodiment of the invention the determination of when to charge is determined inferentially based on monitoring RSSI of the transmissions from these stations to determine when the RSSI from these stations falls below a threshold level. In another embodiment of the invention the need to recharge a station may be determined inferentially by the MWCS based either or both the time the target station has been in operation and or the amount of traffic sent by that target station. Alternately the need to recharge a station may be determined directly via a WiFi communication with the target station by either the WAP or by the MWCS directly, in which parameters such as: battery capacity, battery charge level are obtained. In the former case the WAP would relay the information to the MWCS. In the latter case the target station would send the information directly to the MWCS over either the WiFi or other communication link; e.g. Bluetooth, Zigby, Thread . . . etc. In an embodiment of the invention a history of a target station's prior charge amount, and the intervals at which charging is required may be incorporated into the recharging schedule determination. Recharging of the identified stations may be executed in a round-robin fashion. Alternately, recharging of the identified stations may be executed on an as needed basis. In an embodiment of the invention the MWCS notifies the target station either that is scheduled for a charge, or that it is on its way to deliver the charge. The navigation circuit 284 is also coupled to the WiFi Stage to monitor the RSSI or power of received communications of a target station and move the MWCS in a direction which maximizes the RSSI or power of the received communications therefrom. In an embodiment of the invention the navigation circuit 284 includes the capability of deriving path metrics 284 to each of identified stations as well as the charging dock in memory 290 and of storing these metrics in path memory tables 294 in memory 290. In another embodiment of the invention the wireless asset management circuit 282 retains a history of the charging needs, frequency, time required, and amount of charge for each of the targeted stations and correlates this information into a recharging schedule 296 which is also stored in memory 290.

The integral power component in an embodiment of the invention, comprises batteries 120A-B which energize all components and circuits of the MWCS via electrical connections thereto. This power component is rechargeable and is recharged as needed by autonomous return of the MWCS to the recharging dock under control of the navigation circuit 284. The determination of when self-recharging of the MWCS is required is determined by the power monitor circuit 286 which is coupled to the power component.

Mobility of the ground based MWCS is provided by the mobility component e.g. motor and wheel pairs 212A & 122A and 212B & 122B. Energy is supplied to the motors from the power component, with each motors rotation, e.g. rate and direction, controlled by the navigation circuit 284.

The wireless charger 126 under control of the wireless charge control circuit 288 inductively charges each targeted station from a location proximate thereto to which the MWCS has navigated. In an embodiment of the invention the transfer of energy is accomplished via low frequency electromagnetic induction via a complementary pair of coils on the MWCS and the target station. In another embodiment of the invention the transfer of energy is accomplished via high frequency electromagnetic induction via a complementary pair of antenna(s) on the MWCS and the target station. In still another embodiment of the invention the MWCS includes only the existing WiFi antennas which accomplish the transfer of energy to a target station via high frequency electromagnetic induction, thereby avoiding the necessity for a separate wireless recharger 126. The wireless charge control circuit determines when the proximity of the MWCS to the target station is close enough to initiate wireless charging, as well as the type of charging to implement, e.g. antenna based or coil based. The wireless charge control circuit also determines when the charge of a target station is complete, marking the onset of the movement of the MWCS to the next target station to charge or to the charger dock for self-recharging.

The optional sensors 289 may complement the existing WiFi based navigational capabilities of the MWCS, in which instance they are coupled to the navigating circuit 284. Optional sensors may include: Light Detection and Ranging (LIDAR), Charge Coupled Device (CCD), mechanical bumper, Infrared (IR), Global Positioning System (GPS), etc.

FIG. 3 is a process flow diagram of processes associated with operating the MWCS. Processing begins with process block 300 in which the wireless charging capabilities of associated stations on the WLAN are determined. In an embodiment of the invention the capabilities determination is made during a capabilities exchange between the WAP and each station, such as that which is part of the IEEE 802.11 standard. In an embodiment of the invention the MWCS sniffs this communication to determine which stations can be targets for wireless recharging. In another embodiment of the invention the WAP passes this capability information to the MWCS. In still another embodiment of the invention the MWCS communicates directly with each station which supports wireless charging to determine its capabilities. Next in process 302 the entire subset of associated stations which accommodate wireless recharging; a.k.a. target stations, are identified. Control is then passed to the block 310 of processes associated with recharging the target stations.

The block 310 of processes associated with recharging target stations is optional process 312 in which any recharging priority or scheduling of recharging for each of the target stations is determined. This determination may be made based on information gleaned during the capabilities determination such as: power requirements, recharging frequency, energy consumption, etc. This determination may alternately be made by accumulating a history of prior recharging intervals and amounts. This determination may alternately be made based on a recharging request directly from the corresponding one of the target stations to the WMCS itself. The recharging priority or scheduling of targeted stations may alternately be determined based on the homeowner's input into a graphical user interface (GUI) on the MWCS (not shown). In any event control is then passed to decision process 314 to determine the next target station to recharge. If there are no target stations which currently require recharging then control returns to process 300. Alternately, if there is a target station to recharge then control is passed to process 316. In process 316 the target stations WiFi communications are monitored for RSSI and or power. Next in process 318 the MWCS is moved toward the target station using the monitored WiFi communications and any auxiliary sensors which the MWCS may have for navigation. Then in decision process 320 a determination is made as to whether the MWCS has reached a position relative to the target station is less then a threshold distance below which wireless recharging can be initiated. If the MWCS is still too far from the target station for wireless recharging then control returns to process 316. When the MWCS has reached an optimal proximate location to the target station control is passed to process 322 in which the wireless recharging/charging of the target station is effected. Wireless charging may be accomplished using an inductive coupling between the MWCS and the target station provided by antenna or coils on the MWCS and target station which inductively link them during recharging to transfer power from the MWCS to the target station. After each target station is recharged control is then passed to the self recharging block 330 of processes.

The self recharging block 330 of processes assures that MWCS itself maintains the charge of its integrated power component, e.g. battery or capacitor at a level sufficient to perform its recharging tasks for the targeted stations. In process 332 the MWCS checks its own internal power level. Then in decision process 334 a determination is made as to whether the internal power level of the MWCS has fallen below a threshold level. If it has not then control is returned to the block 310 of processes associated with recharging the next target station. Alternately, if the MWCS needs recharging itself, then control is passed to process 336. In process 336 sensors are used to identify the location of the MWCS's charging dock. In an embodiment of the invention an IR sensor on the MWCS may be used to track an IR beacon emitted by the charging dock. In another embodiment of the invention the charging dock may be a station itself and the MWCS uses the RSSI or power of the received communications from the charging dock to aid its return navigation. Next in process 338 the MWCS navigates to the charging dock. Next in decision process 340 a determination is made that the MWCS has docked with its charging dock. If it has not control returns to process 338 for further navigation. If it has then control is passed to process 342 in which the MWCS is recharged, after which process control returns to process 300.

The components and processes disclosed herein may be implemented in a combination of software circuits, hardware, firmware, processor executing program code stored in non-volatile memory as integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A mobile wireless charging unit comprising:
  a wireless asset management circuit to manage a mobile power resupply for one or more stations of a plurality of stations associated with a wireless local area network (WLAN) having a wireless access point (WAP) to identify stations of the plurality of stations which support wireless charging, and determine a charging schedule for one or more target stations of the plurality of stations that support wireless charging by monitoring transmissions from the one or more target stations of the plurality of stations to determine when to charge the one or more target stations based on degradation over time of a Received Signal Strength Indicator (RSSI);
  a navigation circuit coupled to the wireless asset management circuit to control movement of the mobile wireless charging unit into one or more positions proximate to the one or more target stations based on the charging schedule; and
  a wireless charger circuit coupled to the wireless asset management circuit to initiate wireless charging of one of the one or more target stations of the plurality of stations from the associated position proximate.

2. The mobile wireless charging unit of claim 1, further comprising:
  a mobility component coupled to the navigational circuit and responsive thereto, and the mobility component transporting the mobile wireless charging unit by changing the position of the mobile wireless charging unit.

3. The mobile wireless charging unit of claim 1, further comprising:
  a power component integral coupled to the wireless charger circuit circuits to provide power thereto.

4. The mobile wireless charging unit of claim 1, wherein the wireless asset management circuit is to further determine the charging schedule based on a history of each of the one or more target stations' prior charge amount and intervals at which charging is required.

5. The mobile wireless charging unit of claim 1, wherein the wireless asset management circuit is to determine the charging schedule based on monitoring at least one of: amount of traffic sent by one or more target stations or the duration of communications by the one or more target stations.

6. The mobile wireless charging unit of claim 1, wherein the wireless asset management circuit is to further determine when to charge the one or more target stations based on information sent by the one or more target stations.

7. The mobile wireless charging unit of claim 1, wherein the wireless asset management circuit is to further identify any of the plurality of stations which support wireless charging based on information received by the WAP during a wireless capabilities exchange with each of the plurality of stations.

8. The mobile wireless charging unit of claim 1, wherein the navigation circuit to navigate the mobile wireless charging unit into the position proximate to the one of the one or more target stations by navigating a path to maximize RSSI of the received communications.

9. The mobile wireless charging unit of claim 1, wherein the wireless charger circuit further includes:
  an inductive electromagnetic circuit to inductively couple to the one or more target stations.

10. The mobile wireless charging unit of claim 1, wherein the wireless charger circuit further includes:
  a directional antenna to electromagnetically couple to the one or more target stations.

11. The mobile wireless charging unit of claim 1, wherein the wireless charger circuit is coupled to at least one antenna to electromagnetically couple to the one or more target stations.

12. The mobile wireless charging unit of claim 1, further comprising:
  a mobility component coupled to the navigational circuit and responsive thereto, and including:
  motorized wheels to provide translational movement of the mobile wireless charging unit on a floor of a structure surrounding said WLAN under control of the navigational circuit.

13. The mobile wireless charging unit of claim 1, further comprising:
  a mobility component coupled to the navigational circuit and responsive thereto, and including:
  motorized propellers to provide translational movement of the mobile wireless charging unit within an airspace of a structure surrounding said WLAN under control of the navigational circuit.

14. A method for operating a mobile wireless charging unit comprising:

managing a mobile power resupply for one or more stations of a plurality of stations associated with a wireless local area network (WLAN) having a wireless access point (WAP) by:

identifying stations of the plurality of stations that support wireless charging;

determining a charging schedule for one or more target stations of the plurality of stations that support wireless charging by monitoring transmissions from the one or more target stations of the plurality of stations to determine when to charge the one or more target stations based on degradation over time of a Received Signal Strength Indicator (RSSI);

controlling the mobile wireless charging unit into one or more positions proximate to the one or more target stations based on the charging schedule; and wirelessly charging the one or more target stations from the associated position proximate.

15. The method of claim 14, further comprising:

regulating a mobile power component to provide wireless charging to the one or more target stations.

16. The method of claim 14, wherein the charging schedule is based on a history of each of the one or more target stations' charging needs, frequency, time required, and amount of charge required.

17. The method of claim 14, wherein the charging schedule is based on monitoring at least one of: amount of traffic sent by each of the one or more target stations or the duration of communications by each of the one or more target stations.

18. The method of claim 14, wherein the charging schedule is based on information sent by each of the one or more target stations.

19. The method of claim 14, wherein the identifying comprises:

identifying any of the plurality of stations which support wireless charging based on information received by the WAP during a wireless capabilities exchange with each of the plurality of stations.

20. The method of claim 14, wherein controlling the mobile wireless charging unit comprises:

navigating a path to maximize RSSI of the communications.

21. The method of claim 14, wherein the wireless charging comprises:

inductively coupling to one of the one or more target stations of the plurality of stations.

22. The method for of claim 14, wherein the wireless charging further comprises:

electromagnetically coupling to one of the one or more target stations of the plurality of stations.

23. The method of claim 14, wherein the wireless charging further comprises:

electromagnetically coupling to one of the one or more target stations of the plurality of stations via at least one antenna to charge said station.

24. The method of claim 14, wherein controlling the mobile wireless charging unit further comprises:

controlling motorized wheels to provide translational movement of said wireless station on a floor of a structure surrounding said WLAN.

25. The method for operating a wireless station of claim 14, wherein controlling the mobile wireless charging unit further comprises:

controlling motorized propellers to provide translational movement of said wireless station within an airspace of a structure surrounding said WLAN.

* * * * *